INVENTORS: N. J. PIERCE
F. A. POLKINGHORN
BY G. H. Stevenson
ATTORNEY

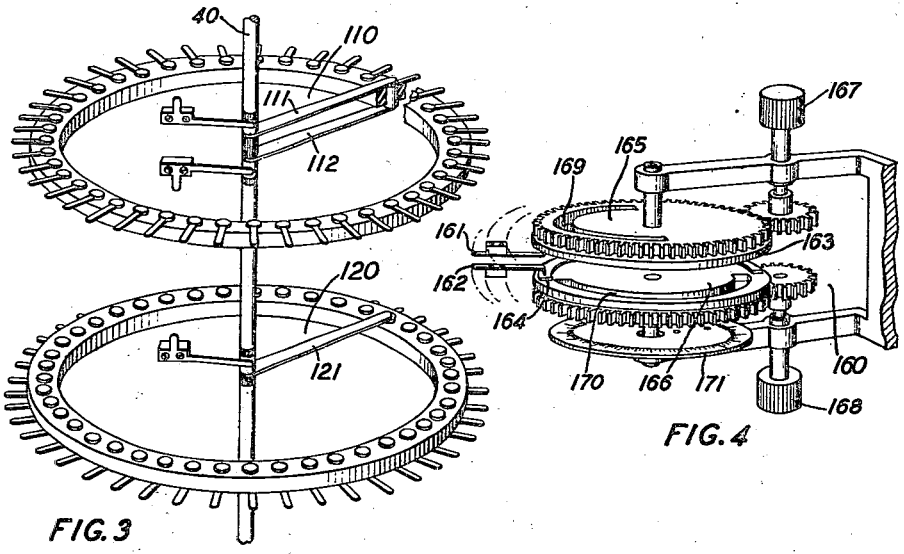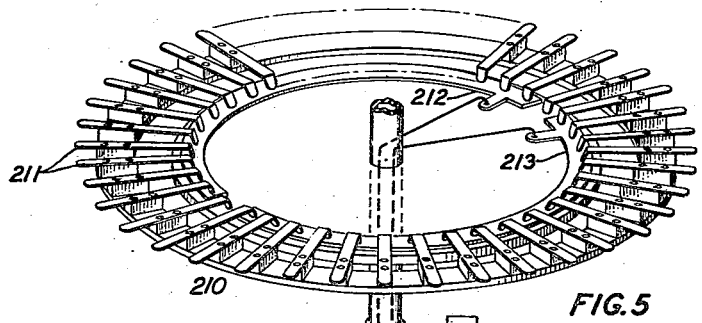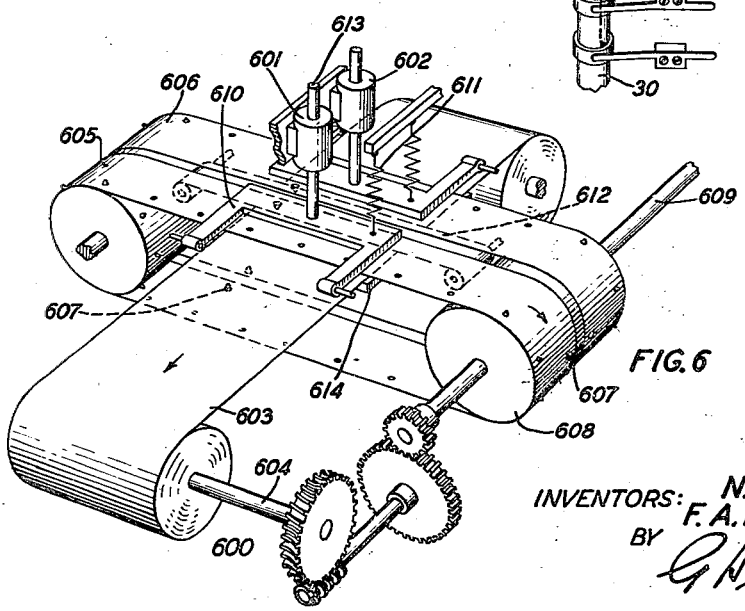

Patented Sept. 26, 1939

2,173,858

UNITED STATES PATENT OFFICE 2,173,858

RADIO SYSTEM

Norman J. Pierce, Middletown, and Frank A. Polkinghorn, Montclair, N. J., assignors to Bell Telephone Laboratories, Incorporated, New York, N. Y., a corporation of New York Application June 23, 1937, Serial No. 149,824

11 Claims. (Cl. 250—11)

This invention relates to radio communication systems and more particularly to systems employing sharply directive antenna arrays of the steerable type.

An object of the invention is to provide means for automatically steering such antenna systems, particularly in such a way as to follow any changes in the direction or angle of arrival of a radio wave.

U. S. Patent 2,041,600 to H. T. Friis, May 19, 1936, discloses and claims a radio system employing an end-on array of directive antennas which have their outputs connected through phase shifters to a common signal circuit. The phase shifters combine the outputs of the antennas in phase for any desired angle of reception, giving an overall characteristic which is highly directive. Also, there is provided a common control for the phase shifters, so that the angle of maximum response may be changed at will. A single antenna array may be used for several separate steerable branches by the use of a corresponding number of phase shifters connected in parallel to the antenna units. When the system is used for receiving, one of these sets may be used as an exploring or monitoring circuit for determining the angles at which waves are arriving.

In one embodiment of the present invention, such a monitoring circuit is continuously cyclically operated and through the use of an automatically operated interlock, caused to control one or more of the other sets of phase shifters so as to so automatically steer such other branches that their directions of maximum response correspond to the directions at which waves of usable amplitude are arriving. In order to get a control responsive to the field pattern as indicated by the exploring action of the monitoring branch, there are provided a group of similar capacitors connected to corresponding segments of a commutator swept by a brush driven synchronously with the monitoring phase shifters. This brush is connected to a rectifier in the output of the monitoring receiver and consequently will supply to each capacitor a charge corresponding to the strength of the received signal at the particular instant. When the charge on any of the capacitors reaches a predetermined value, it will set into operation the interlocking mechanism so as to so adjust the phase shifters of a service channel that the corresponding directive array characteristic will have a maximum response at the angle of reception corresponding to the position of the monitoring phase shifters at such instant. This operation will also cause the discharge of all of the capacitors.

The use of the capacitors makes it possible to integrate the signal for any angle over a period of time determined by the time constant of the charging circuit and thus to give considerable flexibility of operation.

There is also provided means for obtaining records of the field intensities indicated by the monitoring receiver and of the operation of the service phase shifters so as to provide a basis for the optimum adjustment of the operation of the system.

This invention can be more readily understood by reference to the following detailed description in connection with the drawings in which.

Figure 2:
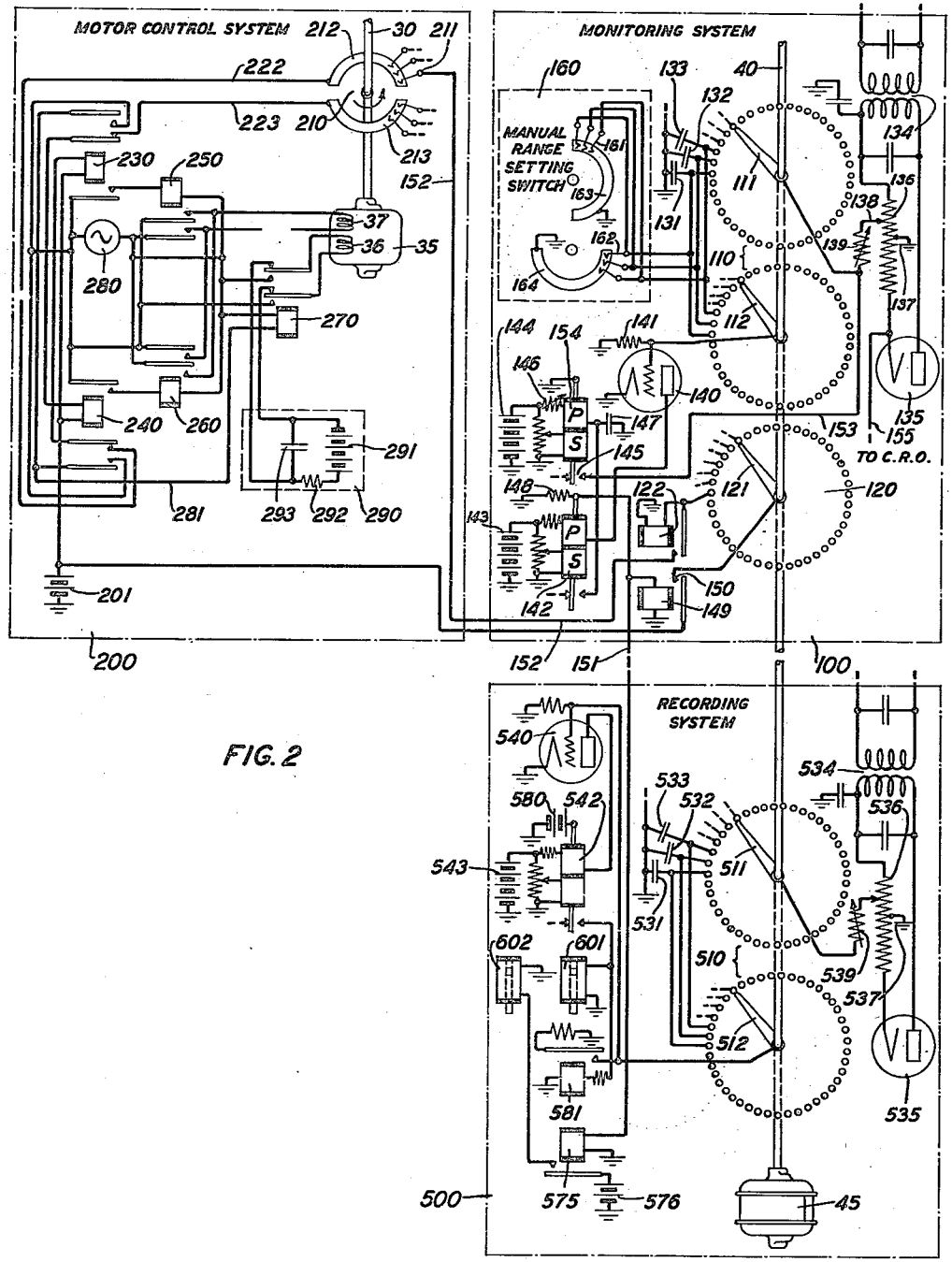
Fig. 2 is a schematic drawing of the circuit details of the automatic control system of Fig. 1.

Figs. 3, 4, 5 and 6 are perspective views of certain of the apparatus units shown schematically in Fig. 2, Fig. 3 being the monitoring commutators, Fig. 4 the manual range setting switch, Fig. 5 the motor control commutator, and Fig. 6 the recorder; and Fig. 7 shows diagrammatically a modification of the phase shifter control to permit operation where the receiver is mounted at an intermediate point in the antenna array.

Similar reference numerals are used for the same elements in all of the figures.

Figure 1:
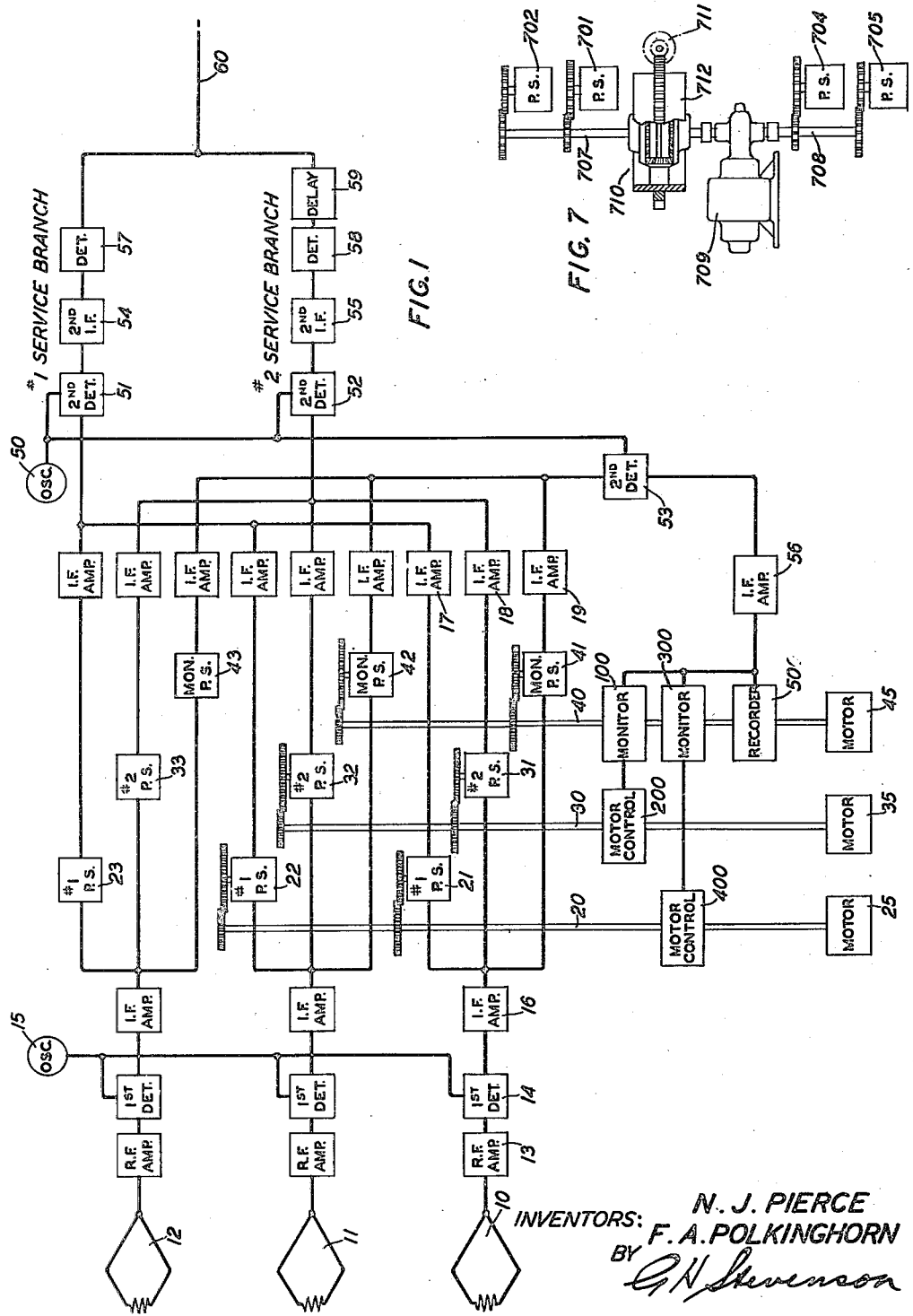
Fig. 1 is a general schematic drawing of one embodiment of the invention in a radio receiver.

Fig. 1 shows a multiple unit steerable antenna of the type described and claimed in U. S. Patent 2,041,600 to H. T. Friis of May 19, 1936, employed with a two branch diversity radio receiver and using the automatic steering system of this invention. As shown, the antenna array comprises three antenna units 10, 11 and 12. It is understood that in any practical system there will usually be many more units, but only three are shown for the sake of simplicity.

These antenna units are connected to similar circuits only one of which will be described in detail. The antenna unit such as 10 is connected to the input of a selective radio frequency amplifier 13, which has its output connected to the first detector 14 of a triple detection radio receiving circuit. Heterodyning oscillations are supplied to this detector in parallel with the similar detectors connected to the other antenna units from an oscillator 15. The resultant intermediate frequency oscillations are selectively amplifying in an intermediate frequency amplifier 16. The output of this amplifier is connected to three adjustable phase shifters 21, 31 and 41 in parallel. These may be, for example, of the type disclosed and claimed in U. S. Patent 2,004,613 to Meacham, June 11, 1935.

The phase shifter 21, together with the corresponding phase shifters 22 and 23 of the other antenna units, constitute a first service branch. Similarly the phase shifter 31 and the corresponding phase shifters 32 and 33 constitute a second service branch and phase shifter 41 with the corresponding phase shifters 42 and 43 constitute a monitoring or exploring branch.

As described in detail in the Friis patent, referred to above, each set of phase shifters such as 21, 22 and 23 constitutes a separately steerable branch of the system and when the phase shifters 21 and 22 are properly aligned and connected by the proper gear ratios to a control shaft 20, the direction of maximum response of such branch may be steered by rotating the shaft 20. Phase shifters 31 and 32 are similarly geared to a control shaft 30, and phase shifters 41 and 42 to the monitoring control shaft 40. The phase shifters 23, 33 and 43 may be dummies.

The output of the phase shifters 21 is connected through a selective intermediate frequency amplifier 17 to the input of the No. 1 service branch, second detector 51 in parallel with the similarly amplified outputs of the phase shifters 22 and 23. Similarly, the output of the phase shifter 31 after being amplified in the intermediate frequency amplifier 18 is connected to the input of the second detector 52 of the No. 2 service branch, in parallel with the amplified outputs of the phase shifters 32 and 33. The outputs of the monitoring phase shifters 41, 42 and 43 after amplification in intermediate frequency amplifiers 19 are connected to the monitoring branch second detector 53.

Beating oscillations are supplied to the second detectors 51, 52 and 53 from a common oscillator 50. The resulting second intermediate frequency waves are amplified in the corresponding second intermediate frequency amplifiers 54, 55 and 56.

In the case of the service branches, the outputs of the second intermediate frequency amplifiers 54 and 55 are supplied to the signal detectors 57 and 58, respectively and the signal outputs combined in a common signal circuit 60. Since, as described in detail in the Friis patent referred to above, the signal currents in the service branches 1 and 2 may arrive at the receiver over different paths, they may arrive at different times, and in order to compensate for this discrepancy in time of arrival there is inserted in the No. 2 service branch, which is assumed to be receiving the wave traveling over the shorter path, a variable audio delay network 59 which is controlled either manually or automatically to bring the outputs of the two service branches into time phase.

The shaft 40 of the monitoring phase shifters is continuously driven by a motor 45. During each revolution of the shaft 40 the major lobe of the directive characteristic of the monitoring branch will make a complete sweep of the operative angles of the branch, thereby serving to explore the usable field of the system. As a result, value of the output current of the intermediate frequency amplifier 56 will at any instant be an indication of the field intensity at the particular angle of reception corresponding to the angular position of the control shaft 40.

By the use of a cathode ray oscillograph having a sweep circuit controlled by a potentiometer on the shaft 40 and a deflection operated by the rectified output current of the amplifier 56 there may be obtained a visual indication of this field pattern, as described in Patent 2,041,600.

In the system of this invention the output current of the intermediate frequency amplifier 56 is used for causing an automatic adjustment of the phase shifters of the service branches. For this purpose, the output current of the amplifier 56 is supplied to a monitoring circuit 100 which cooperates with a motor control circuit 200 on the shaft 30 to control the phase shifters 31 and 32 and similarly to the monitoring circuit 300 which cooperates with a motor control circuit 400 on the shaft 20 for controlling the phase shifters 21 and 22. The output current of the amplifier 56 is also supplied to the recorder circuit 500 for giving a permanent record of the field pattern and also of the operation of the service branch phase shifters.

Reference will now be made to Fig. 2 which shows in schematic form the details of the monitoring circuit 100, the control circuit 200 and the recorder circuit 500. The monitoring circuit 300 and motor control circuit 400 are not shown in detail as they are identical with the corresponding circuits 100 and 200.

For the purpose of the automatic control there is provided on the shaft 40 a double commutator 110 and a single commutator 120. (The mechanical construction of one embodiment of these commutators is shown in Fig. 3.) Contacting with the commutators 110 are two in-phase brushes 111 and 112. There are provided a series of condensers 131, 132, 133, etc., each of which has one terminal connected to a corresponding one of the interconnected segments of the double commutator 110 and all have their other terminals connected to the common ground circuit.

The output of the intermediate frequency amplifier 56 is connected through a tuned transformer 134 to a rectifier circuit including a diode rectifier 135 and a load resistor 136. A variable tap 138, on the negative side of the grounded point 137 of the load resistor 136, is connected through a variable resistor 139 to the brush 111. The output of the rectifier 135 may be connected through lead 155 to a cathode ray oscillograph for giving a visual indication of the field pattern, as previously described.

A three-electrode vacuum tube 140 is operated as a vacuum tube voltmeter or voltage-responsive device. The grid of this tube 140 is connected to the brush 112, the input circuit being completed through the resistor 141 to the grounded cathode. The anode of the vacuum tube 140 is connected through the primary winding of a polarized relay 142 to the plate current battery 143, the anode circuit being completed to the cathode at the grounded terminal of the battery.

There is provided in circuit association with the relay 142 a second polarized relay 154. A battery 144 normally supplies biasing current to the secondary winding of this relay to hold the armature away from the contact 145 which is connected to the brush 111. The battery 144 is also connected through a resistor 146, primary winding of the relay 154, and condenser 147 to ground for a purpose which will be described later in connection with the operation of the system.

The armature of the relay 142 is connected to the winding of a relay 149 which is normally unoperated and has its normally open contact 150 connected to the brush 121 associated with the commutator 120. The lead 151 from the armature of the relay 142 also connects to the recording system 500 as will be later described.

Each of the segments of the commutator 121 is connected to the winding of a relay 122 of a group of similar relays (only one of which is shown). A connection 152 connects the normally open contact of the relay 122 to the motor control circuit 200 and similar connections are provided for the other relays of the group.

As the motor 45 drives the control shaft 40 the brush 111 makes contact successively with the segments of the commutator 110, supplying to each of the condensers 131, etc. a charge corresponding to the amplitude of the output current of the amplifier 56 at the particular instant. The capacity of each of these condensers and the resistance of the circuit are preferably so chosen that it takes an appreciable time (several revolutions of the brush 111) to charge any one of the condensers to the maximum value of the voltage supplied by the rectifier. The time of this integrating period may be readily controlled by varying the variable resistor 139. Under normal conditions such as the beginning of a cycle of operation, the tube 140 is drawing plate current to hold the relay 142 in the operated position. At the same time that each of the condensers 131, etc. is receiving a charge through the brush 111, the cumulative charge on such condenser is supplied to the grid of the tube 140 through the brush 112. When such a charge reaches a predetermined value, it will reduce the plate current of the tube 140 and cause the momentary release of relay 142.

The release of relay 142 closes a circuit from condenser 147 through the contact and armature of relay 142 and resistor 148 to ground causing the discharge of condenser 147. The discharge current of the condenser 147 flows, in parallel to the resistor 148 through the winding of relay 149 causing the momentary operation of that relay. (This current also flows through the winding of relay 575 as will be later described.)

The condenser 147 will then be recharged from the battery 144, through resistor 146 and the primary winding of relay 154. This charging current will cause the operation of the relay 154, which will hold up during the charging period of the condenser, during which time the brush 111 will be connected through the connection 153 and armature of the relay 154 to ground, forming a discharge circuit for each of the condensers 131, etc. as the brush 111 successively contacts the corresponding segments of the armature 110. The charging period of the condenser 147 is made such that the relay 143 will remain operated for a period sufficient to discharge all of the condensers 131, etc. which must be for at least one revolution of the brush 111 and preferably longer.

The operation of relay 149 completes a circuit from a common battery 201 through armature and contact of relay 149, brush 121, the corresponding segment of commutator 120 and the winding of corresponding relay 122, causing the operation of such relay. This will cause the particular relay 122 to lock up through the circuit completed through its own armature to produce the operation of the motor control circuit 200 of the phase shifter shaft 30.

Referring to the motor control system 200 there is provided a reversible alternating current motor 35 for driving the shaft 30. This motor is provided with a running winding 36 and a starting winding 37, the circuit of the latter of which is completed through a centrifugal switch (not shown) which will open up the circuit when the motor comes up to speed, in a manner well known in the art. In the drawings, the motor 35 is shown directly connected to the shaft 30 for the purpose of simplicity, though in actual practice it will usually be connected through reduction gearing.

There is also provided on the shaft 30 a commutator mechanism 210 (the mechanical arrangement of one embodiment of which is shown in Fig. 5). This commutator mechanism provides means for causing the shaft 30 to be brought to any one of a plurality of positions by the shorter angular movement of the shaft. It comprises a plurality of contact segments 211 and two segmental brushes 212 and 213 of equal circumferential length, one or the other of which contacts all but two of the commutator segments 211. The brushes 212 and 213 are connected through leads 222 and 223, respectively to a circuit including relays 240, 250 and 260 for controlling the operation of the motor 35 to bring about the proper angular adjustment of the shaft 30.

The operation of this motor control system will be described in connection with its operation to move the shaft 30 to one particular position. Assuming a relay 122 has been operated by the operation of the monitoring system as previously described to complete a circuit from ground through the winding and armature of such relay 122 and lead 152 to the corresponding armature segment 211, there will then be completed a circuit from this segment 211 through brush 212, lead 222, contact and lower inner armature of relay 240, winding of relay 230 and battery 201 to ground. This will hold the relay 122 operated and cause the operation of relay 230.

The operation of relay 230 causes the following operations: (1) the upper inner armature of the relay opens up the circuit 223 from the brush 213 to prevent false operation of the relay 240; (2) closes a circuit from the left terminal of the alternating current source 280 through the upper outer armature of relay 230, lead 281, winding of relay 270 to the right-hand terminal of the source 280, and (3) closes a circuit from the left-hand terminal of source 280 through lower armature of relay 230, winding of relay 250 to the right-hand terminal of source 280.

The operation of relay 250 closes a circuit from the source 280 to the starting winding 37 of the motor 35. Simultaneously, the operation of the relay 270 (as above described) closes a circuit from the source 280 to running winding 36 of the motor. The direction of application of the alternating current to the winding 37 causes the motor to start in one direction which will be termed forward as indicated by the arrow associated with the armature 210.

The motor will then drive the shaft 30 until the insulated space between the brushes 212 and 213 reaches the contact 211 at which instant the ground connection for the lead 222 is broken causing the release of relay 230 and consequently of the relays 250 and 270 opening the alternating current circuits to the windings 36 and 37 and causing the motor 35 to stop.

In order to bring about the rapid stopping of the motor 35 so that the segment between the brushes 212 and 213 will not override the contact 211, there is associated with the contacts of the relay 270 a motor brake circuit 290. This circuit comprises a battery 291 having a voltage considerably higher than the normal voltage of the running winding 36. Connected in series with the battery 291 are a resistor 292 and a condenser 293. The terminals of the condenser 293 are also connected to the back contacts of the relay 270. During the period that the motor 35 is running, these contacts are open and the condenser 293 charges to the full voltage of the battery 291. When the relay 270 releases to stop the motor 35 the condenser is connected to running winding 36 through the back contacts of the relay so that the condenser discharges through the running winding 36 bringing the motor to an abrupt stop. During the period in which the motor 35 is not in motion, the connection from winding 36 to the battery 291 is maintained but the resistor 292 is made of such a value that the direct current through the winding 36 will not be sufficient to injure it.

If the operation of the monitoring system 100 causes the selection of such a one of the other relays 122 that one of the contacts 211 in contact with the brush 213 is connected to ground, it will cause the operation of the relay 240 which will set up a series of operations similar to that set up by the operation of relay 230 except that in this case the relay 260 instead of the relay 250 will be operated. It will be noted that the connection of the armatures of the relay 260 is such as to supply alternating current from the source 280 to the starting winding 37 in the opposite direction to which it is supplied by the operation of the relay 250. This will cause the motor 35 to rotate in the reverse direction. In all other respects the operations are the same.

As so far described, the monitoring system 100 operates throughout the full range of variations of the phase shifters mounted on the shaft 40. It is desirable in some cases to limit the operation to a portion only of the range, particularly when two or more service channels are operated from the same antennae array as shown in Fig. 1. For this purpose there is provided a manual range setting switch 160. The mechanical construction of such a switch is shown in Fig. 4 and the method of connection in Fig. 2. This switch comprises two commutators 161 and 162 each having the same number of segments or contacts as the commutator bank 110. Contacting with each of the respective commutators is a semi-circular brush 163 and 164. Brush 163 is mounted on a gear 165 and the brush 164 on a gear 166. The gears 165 and 166 are driven by the respective control knobs 167 and 168 through corresponding pinions. Each of the gears 165 and 166 has cut therein a semi-circular aperture 169 and 170 respectively. A scale 171 is mounted below the gears.

The corresponding segments of the commutators 161 and 162 are connected in parallel and to the ungrounded terminals of the respective condensers of the group 131, 132, 133, etc. The brushes 163 and 164 are connected to ground by the operation of the control knobs 167 and 168, the corresponding brushes 163 and 164 can be made to short-circuit a desired portion of the condensers 131, 132, 133, etc. Those condensers which are not short-circuited will represent that portion of the range of the system which will be operative. The portion of the scale 171 which is visible through the apertures 169 and 170 will indicate the operative range for any particular setting.

In order to obtain a continuous record of the field intensity pattern as indicated by the monitoring circuit, there is provided a recording system 500 which operates in conjunction with the recording mechanism 600, the mechanical construction which is shown in Fig. 6. This recorder also makes a record of the settings of the service phase shifters as effected by the monitoring system 100 and the motor control system 200.

The recording system utilizes apparatus and circuit connections in general similar to those of the monitoring system. Similar reference numerals, with the prefix 500 instead of 100, have therefore been used. This system comprises a double commutator bank 510 of the same construction as that of the commutator bank 110. Condensers 531, 532, 533, etc. are connected to the respective segments of this commutator bank. There is also provided a diode rectifier tube 535 having a similar circuit to that of the rectifier tube 535 and connected through a transformer 534 in parallel with the transformer 134 to the output of the amplifier 56. The output of the rectifier 535 supplies charging current to the condensers 531, etc. through brush 511. Brush 512 is connected to the grid of a vacuum tube 540 which is operated as a voltage responsive device. Under normal conditions, the vacuum tube 540 draws space current from the battery 543, holding the relay 542 operated and its contact open. When the charge on any one of the condensers 531, etc. reaches a predetermined negative value the space current of the tube 540 will be decreased and the relay 542 will release. This will complete a circuit from battery 580 through the armature of relay 542 and winding of the dotter solenoid 601 of the recorder 600 and simultaneously through the winding of relay 581. The operation of relay 581 completes a circuit to ground for the brush 512 causing the discharge of that particular one of the condensers 531, etc. the charge on which had reached the predetermined value. In this respect the recording system differs from the monitoring system in which all of the condensers 131, etc. are discharged on the operation of the vacuum tube circuit. In the case of the recording system it is desired to obtain a record of every position at which the field intensity has reached a particular value so that only that particular one of the condensers 531, etc. which caused the operation of the circuit is discharged.

In order to obtain a record of the operation of the monitoring and motor control systems, there is provided a relay 575, the winding of which is connected in parallel with the winding of the relay 149 and operates simultaneously therewith on the discharge current of the condenser 147. The operation of the relay 575 connects the battery 576 to the winding of a second dotter solenoid 602 of the recorder 600.

Referring to Fig. 6 the recorder mechanism 600 comprises a drive for a paper record tape 603 through a drive shaft 604. Traveling transversely of the tape are two similar continuous belts 605 and 606. These belts and the associated recording mechanisms are identical, one being associated with the dotter solenoid 601 for giving a record of the field intensity and the other for dotter solenoid 602 for giving a record of the operation of the service phase shifters. Only one will therefore be described in detail.

The belt 605 has mounted on the inner surface thereof a plurality of evenly spaced styluses 607. Both belts 605 and 606 are driven by a sprocket wheel 608 carried by a shaft 609 geared to or driven synchronously with the shaft 40 thus as a stylus 607 passes over the paper tape 603 its position along the transverse axis of the paper will correspond to an angular position of the shaft 40 and consequently of the adjustment of the phase shifters mounted on that shaft. Pivoted above the belt 605 is a striker plate 610 (support not shown) which is held out of contact with the belt by means of a spring 611. Between the paper 603 and the belt 605 is a typewriter ribbon 612 the drive for which is not shown. Mounted beneath the paper 603 and supporting it is a back plate or platen 614. The dotter solenoid 601 is mounted above the striker plate 610 and has a plunger 613 normal to the striker plate. When the solenoid 601 is energized by the operation of the recorder circuit 500 as previously described, the plunger 613 will be operated to depress the striker plate 610 bringing the paper 603, typewriter ribbon 613 and a stylus 607 in contact and making a dot on the paper 603.

As previously indicated the arrangement of the mechanism for the dotter solenoid 602 and its associated belt 606 is the same as for solenoid 601 and belt 605. As shown in the drawings, the typewriter ribbon 612 overlaps both of the belts 605 and 606 so that if a two color ribbon is used, the dotters 601 and 602 will make dots of different colors.

The density of the dots made by the dotter solenoid 601 on any particular longitudinal line of the paper 603 will give an indication of the field strength for that particular angular position of the monitoring phase shifters and consequently for the corresponding angle of response of the antennae system. The position of the dots made by the dotter solenoid 602 will indicate the particular angular position of the monitoring phase shifters which cause the operation of the motor control circuit to set the service phase shifters.

As shown and so far described, the recorder 600 will make a record of the operation of only one monitoring control 100 and its associated motor control 200. The operation of one or more other monitoring circuits and associated motor control circuits such as 300 and 400 may be recorded on the same record by connecting to the dotter solenoid 602 in parallel with the contacts of relay 575 the contacts of a similar relay which is connected in the same way to such second control circuit.

While the automatic phase control system as shown and described above operates with the monitoring phase shifter and the service phase shifter connected to the same antennae array, it is to be understood that they may be connected to separate arrays. For example, the monitoring circuit may be associated with the monitoring phase shifter of the receiving system and operate to control the phase shifters associated with the antennae array of a transmitting system.

Fig. 1 shows the mechanical arrangement of the phase shifter operating shift where the receiver is located at one end of the antenna array. When, as would be the more usual case, the receiver is mounted at an intermediate point along an end-on array a different mechanical arrangement will be required. This is primarily because of the fact the waves arriving at the antenna units on one side of the receiver arrive at the units more distant from the receiver before arriving at those closer thereto while for the antenna units on the other side the waves will arrive at those closer to the receiver before arriving at those more distant.

As described in detail in Patent 2,041,600 the arrangement of the mechanism for the simultaneous operation of the phase shifters depends upon the spacing of the antenna units and the length of the transmission lines connecting the antenna units to the phase shifters. When the receiver including the phase shifters is located at an intermediate point along the array the group of phase shifters associated with the units on one side of the receiver must be adjusted in one direction or sense and the group associated with the antenna units on the other side of the receiver in the opposite direction. Also, the relative adjustment between the two groups of phase shifters depends upon frequency of the waves being received.

Fig. 7 shows a mechanical arrangement for adjusting the phase shifters in such a system. In this figure the phase shifters 701 and 702 are the phase shifters for the antenna units on one side of the receiver. Phase shifters 704 and 705 are those for the antenna units on the other side of the receiver. The group of phase shifters 701 and 702 are connected through gears of the proper ratios to a drive shaft 707. The group of phase shifters 704 and 705 are similarly geared to a shaft 708. The latter shaft 708 is driven by a motor 709 and by means of a differential gear mechanism 710 drives the shaft 707 in the opposite direction to cause an adjustment of the phase shifters 701 and 702 opposite to that of the phase shifters 704 and 705 as is required. The pinion 711 mounted on a shaft with a control knob, not shown, permits the adjustment of the spider 712 of the differential gear mechanism to cause the adjustment of the relative phase of the two groups of phase shifters as is required, according to the frequency of operation.

What is claimed is:

1. In a steerable antenna system, an antenna array, a plurality of sets of variable phase shifters connected in parallel to certain of the antenna units of said array, a translating circuit connected to the output of each set of phase shifters, means for continuously, cyclically controlling one set of phase shifters to vary the directive response of said system, and means responsive to the signals in the translating circuit connected to said one set of phase shifters for automatically adjusting another of said sets of phase shifters.

2. In a steerable antenna system, an antenna array, a plurality of sets of variable phase shifters connected in parallel to certain of the antenna units of said array, a translating circuit connected to the output of each set of phase shifters, means for continuously cyclically controlling one set of phase shifters, a plurality of capacitors each corresponding to a different point in the cycle of adjustment of said one set of phase shifters, means for charging said capacitors in proportion to the respective signal output of the translating circuit connected to said one set of phase shifters as said one set of phase shifters is cyclically controlled, and means responsive to a charge above a predetermined value on any one of said capacitors for so adjusting another of said sets of phase shifters that the corresponding translating circuit will have a maximum response for waves from a corresponding direction.

3. In a steerable antenna system, an antenna array, a plurality of sets of variable phase shifters connected in parallel to certain of the antenna units of said array, a translating circuit connected to the outputs of each set of phase shifters, means for continuously cyclically controlling one set of phase shifters to obtain a cyclic variation of the effective direction of maximum response, a plurality of capacitors each corresponding to a different direction of response, means for charging said capacitors in proportion to the respective signal output of the translating circuit connected to said one set of phase shifters as said one set of phase shifters is cyclically controlled, and means responsive to a charge above a predetermined value on one of said capacitors for automatically so adjusting another of said sets of phase shifters that the corresponding translating circuit will have a maximum response at the direction to which said one capacitor corresponds.

4. In a steerable antenna system, an antenna array, a plurality of sets of variable phase shifters connected in parallel to certain of the antenna units of said array, a translating circuit connected to the outputs of each set of phase shifters, means for continuously cyclically controlling one set of phase shifters to obtain a cyclic variation of the effective direction of maximum response, a plurality of capacitors each corresponding to a different direction of response, means for charging said capacitors in proportion to the respective signal output of the translating circuit connected to said one set of phase shifters as said one set of phase shifters is cyclically controlled, and means responsive to a charge above a predetermined value on one of said capacitors for automatically so adjusting another of said sets of phase shifters that the corresponding translating circuit will have a maximum response at the direction to which said one capacitor corresponds, and means also responsive to such charge for causing the discharge of all of said capacitors.

5. A steerable antenna system comprising at least two directive antenna units, a plurality of variable phase shifters connected to one of said antenna units, a translating device connected to each of said phase shifters and to the other antenna, means for continuously cyclically varying one of said phase shifters to cyclically change the direction of response at which the waves from said antenna and from said one phase shifter combine in phase in the corresponding translating device, means for obtaining a measure of the amplitude of the waves in said corresponding translating device for a plurality of directions of response, and means responsive to such measure for automatically adjusting another of said phase shifters so that the waves in the translating device connected thereto combine in phase with the waves from said other antenna for a direction at which the reception as indicated by the measuring means is above a predetermined value.

6. In combination, a steerable antenna array comprising a plurality of antenna units, a plurality of sets of variable phase shifters, one phase shifter of each set being connected in the leads from each of certain of said antenna units, and means for simultaneously controlling the phase shifter of each set so that the outputs thereof are in phase for each corresponding angle, means for continuously controlling one of said sets of phase shifters so that the antenna pattern continuously sweeps the field of oscillation, means responsive to the output of said one set of phase shifters for producing a series of electrical charges proportional to the field intensity at the respective angles of reception, and means responsive to any one of said electrical charges above a predetermined value for so setting one of the other of said sets of phase shifters that the maximum reception of said system corresponds to the respective angle.

7. A combination, according to claim 6, in which the means for producing electrical charges comprises a rectifier connected to the output of said one set of phase shifters, a commutator, a capacitor connected to each segment of said commutator, brush means driven in synchronism with the means for continuously controlling said one set of phase shifters and contacting said commutator, means responsive to voltages above a predetermined value, and connections from said brush means to said rectifier and to the voltage responsive means.

8. A combination, according to claim 6, in which the means for producing electrical charges comprises a rectifier connected to the output of said one set of phase shifters, a commutator, a capacitor connected to each segment of said commutator, a brush driven in synchronism with the means for continuously controlling said one set of phase shifters, means responsive to voltages above a predetermined value, connections from said brush to said rectifier, a second brush driven synchronously with the first brush, connections from said second brush to the voltage responsive means and means responsive to the operation of the voltage responsive means for causing said first brush to successively short-circuit said capacitors for a period of at least one revolution of the brush.

9. In a radio receiving system employing an end-on array of directive antenna units, a plurality of sets of variable phase shifters, one phase shifter of each set being connected to each of certain of said antenna units, each of said sets being so mechanically interconnected as to be simultaneously variable to steer the corresponding array directive characteristic, a monitoring receiver connected to one set of phase changers, a service receiver connected to another set of phase changers, means for continuously driving the monitoring set of phase shifters to obtain a cyclic variation of the phase shift to produce a continuous sweep by the array directive characteristic, a brush-commutator combination driven synchronously with said monitoring set of phase shifters, said brush-commutator combination comprising two synchronously driven brushes and parallel connected commutator segments, one set of segments contacting with each of said brushes, a plurality of capacitors, one connected to each commutator segment, a rectifier connected to the output of said monitoring receiver, a connection from the output of said rectifier to one of said brushes to apply to said capacitors in succession negative charges proportional to the amplitude of the output of the monitoring receiver at the particular instant, a vacuum tube voltmeter, a connection from the other of said brushes to the input of said vacuum tube voltmeter, a relay circuit connected to the output of said vacuum tube voltmeter, said vacuum tube voltmeter being adjusted to operate when the charge on any one of said capacitors reaches a predetermined value, means responsive to the operation of said relay circuit for completing a circuit to said one brush for a time sufficient to cause the discharge of all of said capacitors, and means also controlled by said relay circuit for so setting that set of phase shifters connected to the service receiver that the corresponding array directive characteristic is at the same angle as the array directive characteristic of the monitoring circuit at the instant the charge on the capacitor reaches said predetermined value.

10. In a radio system employing an antenna array of directive antenna units each connected through a variable phase shifter to a translating circuit, means for continuously cyclically varying said phase shifters to vary the directive characteristic of said system, means for producing from the output of said translating circuit a plurality of voltages each corresponding to the response of said system at a different particular direction, and means responsive to said voltages for automatically controlling the direction of radiant action of said system.

11. In a radio system employing an antenna array of directive antenna units each connected through a variable phase shifter to a translating circuit, means for continuously cyclically varying said phase shifters to vary the directive characteristic of said system, a plurality of condensers each corresponding to a different direction of response, means responsive to the output of said translating circuit for charging said condensers in accordance with the intensity of response at the corresponding direction, and means responsive to the charge on said condensers for automatically controlling the direction of radiant action of said system.

NORMAN J. PIERCE.
FRANK A. POLKINGHORN.